United States Patent [19]
Vierow et al.

[11] 3,956,676
[45] May 11, 1976

[54] ELECTRICAL DEVICE HAVING ANODE RISER ASSEMBLY WITH POLYMERIC FILM MEANS

[75] Inventors: William F. Vierow, West Acton; Milton Kallianides, Brockton, both of Mass.

[73] Assignee: P. R. Mallory & Co., Inc., Indianapolis, Ind.

[22] Filed: Jan. 17, 1975

[21] Appl. No.: 541,839

Related U.S. Application Data

[63] Continuation of Ser. No. 412,299, Nov. 2, 1973, which is a continuation of Ser. No. 307,651, Nov. 17, 1972, abandoned.

[52] U.S. Cl. .................................. 317/230; 357/72; 317/242
[51] Int. Cl.² ...................... H01G 9/00; H01G 9/16; H01L 23/28
[58] Field of Search ............... 317/230, 242; 357/72

[56] References Cited
UNITED STATES PATENTS

| | | | |
|---|---|---|---|
| 2,014,005 | 9/1935 | Mershon | 317/230 |
| 2,104,018 | 1/1938 | Brennan | 317/230 |
| 3,054,029 | 9/1962 | Wagner et al. | 317/230 |
| 3,239,595 | 3/1966 | Reese et al. | 357/72 |
| 3,335,335 | 8/1967 | Perkins | 317/230 |
| 3,389,311 | 6/1968 | Rayno | 317/242 |
| 3,512,049 | 5/1970 | Hoberman et al. | 317/230 |
| 3,684,927 | 8/1972 | Correll | 317/230 |

*Primary Examiner*—Andrew J. James
*Attorney, Agent, or Firm*—Charles W. Hoffmann; Robert F. Meyer; Donald W. Hanson

[57] ABSTRACT

An anode riser assembly for an anode means comprising an anode riser means and polymeric means substantially adhered to the anode riser to minimize the ingression of electrolyte means to the anode riser. The anode riser means is made of a film-forming metal and, preferably, does not have a myriad of intercommunicating voids therein. The polymeric means, preferably a polyester material having affixed thereto the trademark Mylar (a trademark of E.I. du Pont de Nemours & Co., Inc.) which is chemically inert to the action of the electrolyte means and has high dielectric strength, substantially adheres to and follows the surface contour of the anode riser means to provide an interface therebetween into which is minimized the ingression of electrolyte means adapted to be cooperatively associated with the anode means. The anode riser assembly is especially adapted for use with anode means in either a dry or wet electrolytic capacitor.

The invention also contemplates a method of making the anode riser assembly.

12 Claims, 7 Drawing Figures

U.S. Patent  May 11, 1976  3,956,676
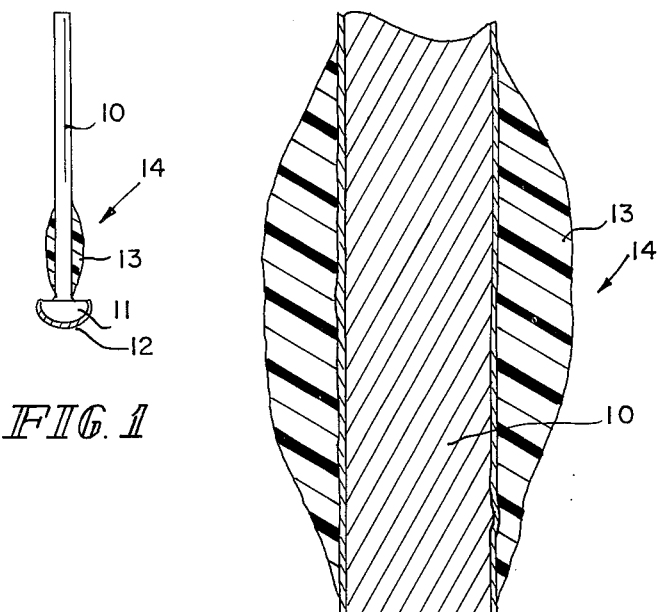
FIG.1
FIG.2
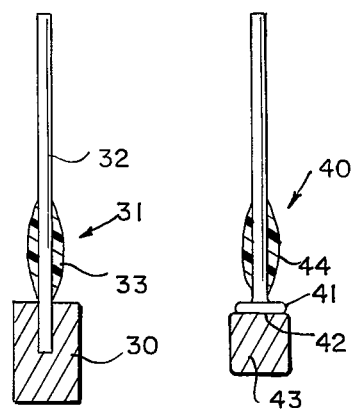
FIG.3   FIG.4
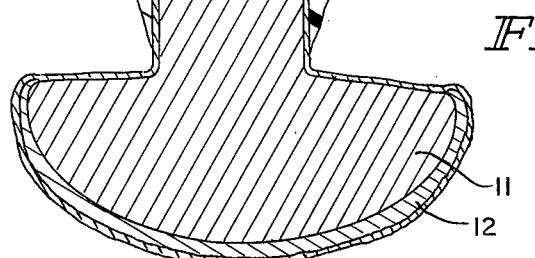
FIG.5
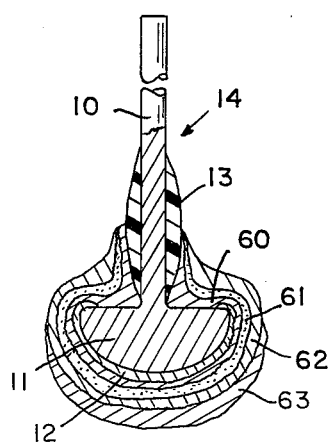
FIG.6
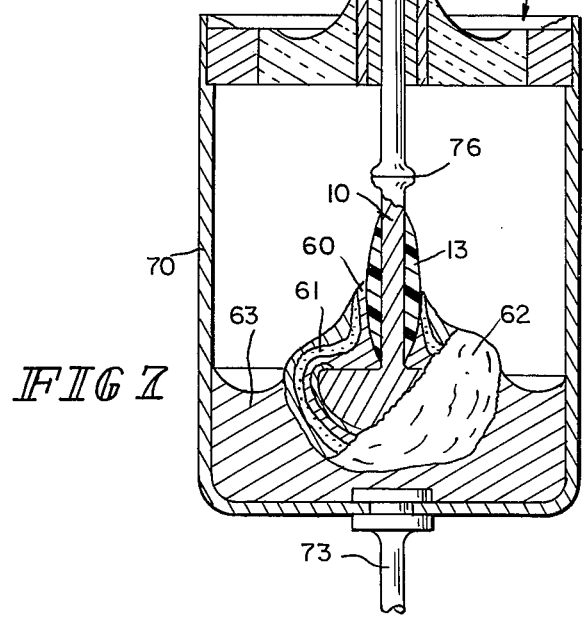
FIG.7

ELECTRICAL DEVICE HAVING ANODE RISER ASSEMBLY WITH POLYMERIC FILM MEANS

This is a continuation of Ser. No. 412,299, filed Nov. 2, 1973, which was in turn a continuation of Ser. No. 307,651, filed Nov. 17, 1972, now abandoned.

The present invention relates to an anode riser assembly and, more particularly, to an anode riser assembly for anode means capable of performing an electrical function and to a method of making the anode riser assembly. The anode riser assembly includes an anode riser means, and polymeric means substantially adhered to and following the surface contour of the anode riser means to provide an interface therebetween into which is minimized the ingression of electrolyte means adapted to be cooperatively associated with the anode means.

In the fabrication of electrical devices such as a fractional capacitor including an anode and an anode riser projecting from the anode, it was found that in order to maintain the capacitance value of the anode at, or relatively near to the capacitance value desired and to maintain the dissipation factor and the D.C. leakage current at acceptable levels, it was necessary to place a polymeric sleeve over the anode riser, and heat shrink the sleeve to close around the anode riser prior to contacting the anode with electrolyte means. The intended function of the heat shrunken sleeve was to help in keeping the electrolyte means from contacting the anode riser. It is apparent that if the electrolyte means contacts the anode riser, the anode riser means will exhibit a capacitance which is additive to the capacitance of the anode of the fractional capacitor. In situations where electrical devices having relatively precise fractional capacitance values are required, that is, capacitors having an anode capacitance of 1 microfarad or less, finished capacitors with anode risers which may or may not contribute to the total of the capacitance values of the capacitors cannot be tolerated because of, among other things, the potential waste of manufacturing time and materials. Heat shrinking a polymeric sleeve over the anode riser reduces the problems associated with the anode riser contributing to the fractional capacitance value of the anode; however, it was found that, in some instances, the heat shrunken sleeve of polymeric material was not sufficiently tight at the interface between the sleeve and the surface of the anode riser to adequately deter movement of the electrolyte means over the anode riser. It appears that where the electrolyte means moves over the surface of the anode riser, that variations in the shrink characteristics of the polymeric sleeve material is the culprit.

In the fabrication of electrical devices such as capacitors using anodes having capacitance values greater than that of the fractional anode, the additive effect of the capacitance of the anode riser is not of as much concern as is the possibility of undesirably high D.C. leakage current and high dissipation factor resulting from the electrolyte means contacting the anode riser. Further, if the anode riser is not anodized, that is, does not have a dielectric film thereover, electrolyte means contacting the metal of the anode riser will result in an electrical short circuit which renders the capacitor inoperative.

Accordingly, it is a feature of the present invention to provide an anode riser assembly including anode riser means and polymeric means cooperatively associated with the anode riser means to minimize the ingression of electrolyte means to the anode riser means. In one form of the invention, the polymeric means is a plastic film of polyester provided by subjecting a polyester material to a temperature at or above its flow point temperature to cause the polyester material to flow over and substantially conform to the surface contour of the anode riser means, and then treating the flowable polyester material on the anode riser means to form a solidified film of polyester suitably adhered to the anode riser means. Another feature of the present invention is to provide a fractional electrolytic capacitor including an anode of film-forming metal, and an anode riser assembly including an anode riser means of film-forming metal and a polymeric film substantially conformed to a selected portion of the surface of the anode riser means and adhered thereto to provide an interface therebetween into which is minimized the ingression of electrolyte means of the capacitor. In another form of the invention, the polymeric film is adhered to the anode riser means subsequent to providing dielectric means over the anode thereby providing the anode riser means with dielectric means. Other features of the present invention will be apparent from the following description, the drawing and the appended claims.

In the drawing:

FIG. 1 is an enlarged elevational view of an anode riser assembly of the present invention wherein an anode riser means includes a headed portion carrying plasma spray deposited particles which after appropriate processing function as an anode;

FIG. 2 is an enlarged sectional view of the anode riser assembly of FIG. 1 illustrating that the polymeric material is adhered to the anode riser means at the opposite ends of the material;

FIG. 3 is an enlarged elevational view of one form of the anode riser assembly of the present invention wherein an end of the anode riser assembly is embedded in an anode;

FIG. 4 is an enlarged elevational view of an anode riser assembly of the present invention having a headed portion to which is joined an anode means;

FIG. 5 is an enlarged view showing a plurality of anodes of the type illustrated in FIG. 1 attached to a hanger for processing in an environment to cause the polymeric material to flow;

FIG. 6 is an enlarged sectional view of the anode riser assembly of the type shown in FIG. 1 showing dielectric means contacting the anode, and the dielectric means contacted by solid electrolyte means; and FIG. 7 is a partial cross-sectional view of a capacitor including as its anode, the anode riser assembly of FIG. 6.

One form of the present invention is illustrated in FIG. 1. An anode riser means 10 having a configuration generally like that of a headed pin has its headed portion 11 plasma spray deposited with particles 12 of film-forming metal particles such as tantalum, niobium, aluminum and the like. The plasma spray deposit 12 at the headed portion 11 of the anode riser means 10 includes a myriad of intercommunicating voids (not shown). The plasma deposit 12 is intended to function as an anode means of an electrical device. The advantages of plasma spray depositing film-forming metal particles on the headed portion 11 are several including helping to overcome the difficulties associated with welding an anode riser means to an anode means and with embedding the anode riser means in the anode means. A suitable polymeric material 13 is flowed over the surface of the anode riser means 10 so as to fill the interstices, if any, in the film-forming metal at the surface of the anode riser means and provide an interface into which is minimized the ingression of electrolyte means (not shown) adapted to be cooperatively associated with the anode means, that is, the plasma spray deposit 12. The anode riser means 10 and the polymeric material 13 cooperate to provide an anode riser assembly 14.

The film of polymeric material 13 is substantially rigid, and adheres and conforms to the surface contour of the anode riser means 10 at least at the extremities thereof and preferably over the entire adjacent surfaces of the anode riser means 10 to furnish an interface between the polymeric material and the adjacent surface of the anode riser means 10 into which is minimized the ingression of electrolyte means adapted to be cooperatively associated with the anode means 12.

One method of providing the anode riser means 10 with the film of polymeric material 13 is to slide suitably dimensioned sleeve of polymeric material such as a polyester material over the anode riser means 10. A suitable polyester material is a polyester sold under the trademark Mylar (a trademark of the E. I. du Pont de Nemours & Co. Inc.) The anode riser means 10 and the polyester sleeve carried thereby are subjected to a suitable method to cause the polyester material to flow over and substantially conform to the contour of the surface of the anode riser means. The polyester material is then treated to substantially adhere it to the surface contour of the anode riser means 10 to furnish a substantially rigid polyester film 13 having an interface between it and the surface of the anode riser means which minimizes the ingression of electrolyte means to the surface of the anode riser means. As shown in FIG. 2, the opposite extremities of the polyester film have a relatively low contact angle indicating satisfactory flow over the anode riser means 10 and the probability of desired wetting and adherence of the polyester material to the surface of the anode riser means contacting the polyester material.

One method of causing the polymeric material 13, that is, the polyester material to flow over the surface of the anode riser means 10 is to subject the material to a temperature at or above its melting point temperature but below its charring temperature for a length of time sufficient to cause the material to flow over, and substantially conform and adhere to the surface contour of the anode riser means. A Mylar (polyester) sleeve material made by the Stone Industrial Corporation of College Park, Maryland, U.S.A. having an internal diameter of, for example, about 0.025 inch and a length of about, for example, about 0.15 inch and seated over the anode riser means 10 having a diameter of, for example, about 0.20 inch is raised to an elevated temperature of about 250°C to 300°C for 3–8 minutes. The processing time and temperature of the polyester material to cause it to flow depends on, among other things, the efficiency of the heat source and the number of anode riser assemblies being possessed. The polyester material of the Mylar sleeve flows over and substantially conforms to the surface contour of the anode riser means 10. The anode means 12 and the cooperatively associated anode riser means 10 are withdrawn from the elevated temperature and allowed to return to room temperature thereby providing the anode riser means 10 with a substantially rigid polyester film means 13 substantially conforming and adhering to the surface of the anode riser means 10.

FIG. 2 is an enlarged sectional view of the anode riser assembly of FIG. 1 illustrating the polymeric means 13 (polyester film) adhered to the anode riser means 10 at the opposite ends of the polymeric means 13. Note that the polymeric film means 13 substantially fills the interstices at the surface of the anode riser means 10, or, alternately, is sufficiently close to the interstices at the surface of the anode riser means to minimize ingression of molecules of the electrolyte means over the surface of the anode riser means. Also observe the low contact angle of the film means 13 with the surface of the anode riser means 10. As pointed out above, a heat shrunken polymeric sleeve material over an anode riser does not come sufficiently close to the surface of the anode riser means 10 to properly minimize ingression of molecules of the electrolyte means to the surface of the anode riser means 10.

The film of polymeric material 13 may be applied to the surface of the anode riser means by methods other than sliding a pre-formed sleeve of polymeric material over the anode riser means 10, flowing the material and then treating the material to solidify it. For example, flowable polymeric material can be applied to the anode riser means 10 by dipping, brushing, and the like. The applied polymeric material can be suitably treated so as to polymerize the material to provide the substantially rigid film of polymeric material 13. Polymeric materials other than Mylar (polyester) can be used to provide the film of polymeric material 13 as long as such materials are chemically inert to the other materials of the electrical device, have proper electrical properties, can be flowed over the anode the anode riser means at a temperature which does not harmfully effect desired characteristics of the components of the electrical device, and be solidified to provide an interface at the surface of the anode riser means 10 which minimizes the ingression of molecules of electrolyte over the surface of the anode riser means.

As regards processing the anodes and cooperatively associated anode riser means of the electrical devices, the film-forming metal of the anodes and anode risers may be anodized, that is, have an oxide film of the metal formed thereon either prior to or subsequent to applying the polymeric film material to the anode riser means; however, in all circumstances, the polymeric film material is applied to the anode riser means prior to contacting the anode means with an electrolyte means. Preferably, the anode and anode riser means are anodized prior to applying the polymeric film material. In anodes to be used for capacitors, anodizing the film-forming metal means and includes forming a film of the metal of the anode over the visible exterior surface and over the surfaces of the intercommunicating voids.

A plurality of anode riser means 10 and anodes 12 are shown in FIG. 5 as being suitably attached to a hanger 50 for subsequent immersion in an atmosphere at an elevated temperature suitable to cause the polymeric material to flow over, and, if necessary, into the interstices of the film-forming metal of the anode riser means. As disclosed previously, Mylar (polyester) sleeve material will suitably flow at 250°C–300°C. The headed portion 11 containing the plasma spray deposited film-forming metal particles 12 remains exposed. The plasma deposit becomes the anode 12 of the electrical device. When used in a capacitor, the exposed plasma deposit provides the capacitance value of a capacitor. It has been found the capacitance value of a capacitor including the anode of FIG. 1 has a capacitance value within about 5% to 10% of theoretical value when produced in batch lots.

An anodized capacitor anode 12 coated with a dry electrolyte of manganese dioxide ($MnO_2$) 60 is shown in FIG. 6. Note that although the $MnO_2$ contacts the polymeric film 13, it does not contact the anode riser means 10 and, therefore, the anode riser means, does not contribute to the capacitance value of the anode. Further, the travel of the $MnO_2$ over the surface of the anode riser at the interface between the surface of the anode riser and the polymeric film is minimized.

It should be appreciated that in a capacitor a wet electrolyte such as sulfuric acid can be used in lieu of a dry electrolyte such as $MnO_2$.

In the situation where the anode 12 and anode riser assembly 14 are to be used as a capacitor, the electrolyte means is suitably contacted with cathode means including, for example, a graphite coating 61, a silver coating 62 and solder coating 63, as shown in FIG. 6, and enclosed in a suitable housing means (not shown). A suitable method for contacting the electrolyte means with cathode means is disclosed in U.S. Pat. No. 3,093,883 granted June 18, 1963.

FIG. 7 shows the anode 12 and the anode riser assembly 14 of FIG. 6 enclosed in a housing means 70. Suitably connected to the solder coating 63 is a metal housing means 70 such as a metal can. A cathode lead 73 is attached to the metal can 70. The open end of the metal can 70 is closed by a suitable seal means such as glass to metal seal 74. An anode lead wire 75 is suitably attached to the anode riser means 10 at weld 76 and projects through seal 74.

Another form of the invention is shown in FIG. 3. FIG. 3 shows anode means 30 with a cooperatively associated anode riser assembly 31 suitable for use in an electrical device capable of performing an electrical function such as, for example, a capacitor. The anode means 30 is made of joined together film-forming metal particles such as tantalum, niobium, aluminum and the like so as to having a myriad of intercommunicating voids. U.S. Pat. No. 3,403,303, granted Sept. 24, 1968, discloses one method of making the anode means 30.

The anode riser assembly 31 includes an anode riser means 32 and a film of polymeric material 33 substantially adhered to and following the surface of the anode riser means. The anode riser means 32 is made of the same film-forming metal as is the anode means 30. The anode riser means 32 may be embedded in, welded to or otherwise suitably attached to the anode means 30. The polymeric material 33 is Mylar (polyester) and can be applied in the manner that polymeric material 13 is applied to anode riser means 13 of FIGS. 1 and 2 of the drawing.

Another form of the invention is shown in FIG. 4. In FIG. 4, anode riser means 40 includes a headed portion 41 having a substantially flat surface 42 attached to anode means 43 by any suitable means such as welding Mylar (polyester) is flowed over the surface of the anode riser means 40 so as to fill the interstices at the surface, if any, of the anode riser means 40 and to adhere to the surface of the anode riser means.

The anode means 43 is made of a plurality of joined together film-forming metal particles so as to have a plurality of intercommunicating voids throughout the anode.

While the invention is illustrated and described in presently preferred embodiments, it will be understood that variations and modifications may by effected without departing from the concepts of the invention.

We claim:

1. A device comprising electrolyte means, anode means capable of performing an electrical function contacted by the electrolyte means, and an anode riser assembly of film-forming metal including an elongated wire-like portion with a surface contour and an integral headed portion formed from the elongated wire-like portion and contacted by the anode means, and polymeric film means substantially adhered to and conforming to the contour of the surface of the elongated wire-like portion of the anode riser assembly to provide an interface therebetween into which is minimized the ingression of electrolyte means, the polymeric film means extending substantially to the headed portion of the anode riser assembly.

2. The device of claim 1, wherein the polymeric means is a polymeric film subjected to a temperature which causes the polymeric means to flow over and substantially conform to the contour of the surface of the elongated wire-like portion of the anode riser assembly, the polymeric film adhered to the surface of the anode riser assembly.

3. The device of claim 1, wherein the anode means includes a deposit of particulate film-forming metal.

4. The device of claim 3, wherein the headed portion of the anode riser assembly with the deposit of particulate material faces away from the elongated wire-like portion of the anode riser assembly in a direction substantially parallel to the central longitudinal axis of the elongated wire-like portion.

5. The device of claim 4, wherein the anode riser assembly is at substantially theoretical density, and the anode means has a capacitance value of 1 microfarad or less.

6. The device of claim 3, wherein the anode means includes dielectric means, the electrolyte means contacts the dielectric means, and cathode means contacts the electrolyte means to form a capacitor, the polymeric film being substantially chemically inert to the electrolyte means and electrically insulating.

7. The device of claim 6 wherein the dielectric means is an oxide film of the film-forming metal, the electrolyte means is selected from the group including wet and solid electrolytes, and the cathode means includes means for housing the anode.

8. The device of claim 6 wherein the polymeric film is selected from the group including polyester materials.

9. An electrical device comprising anode means, electrolyte means contacting the anode means, and an anode riser assembly including an elongated wire-like portion with a surface contour and an end contacted by the anode means, and electrically insulating polymeric film means substantially adhered to and conforming to the contour of the surface of the elongated wire-like portion of the anode riser means to provide an interface therebetween which substantially prevents the ingression of electrolyte means, the polymeric film means extending over the surface of the elongated wire-like portion of the anode riser means substantially to the anode means.

10. The electrical device of claim 9, wherein the anode means includes a porous deposit of film-forming metal having a capacitance value of 1 microfarad or less, and wherein the elongated wire-like portion of the anode riser means is at substantially theoretical density.

11. A method of making the device of claim 1 including the steps of providing an anode riser assembly of film-forming metal including an elongated wire-like portion with a surface contour and an integral headed portion formed from the elongated wire-like portion, covering the surface contour of the anode riser assembly with polymeric means by flowing the polymeric means over the surface contour of the anode riser assembly, and treating the polymeric means to substantially adhere to the surface contour of the anode riser assembly to furnish a substantially rigid polymeric means having an interface at the polymeric means and the surface contour of the anode riser assembly into which is minimized ingression of electrolyte means adapted to be cooperatively associated with the anode riser assembly.

12. The method of claim 11, wherein the step of covering the surface contour of the anode riser assembly with polymeric means includes subjecting the polymeric means to a temperature for a length of time sufficient to cause the polymeric means to flow over the surface contour of the anode riser assembly, and wherein the step of treating the polymeric means includes forming the polymeric means into a polymeric film adhered to the surface contour of the anode riser assembly by subjecting the polymeric means to a temperature which causes solidification of the polymeric means and adherence to the surface contour of the anode riser assembly.

* * * * *